July 26, 1966  D. F. HARVEY  3,262,273
MASTER CYLINDERS FOR HYDRAULIC BRAKING SYSTEMS
Filed Dec. 30, 1964  2 Sheets-Sheet 1
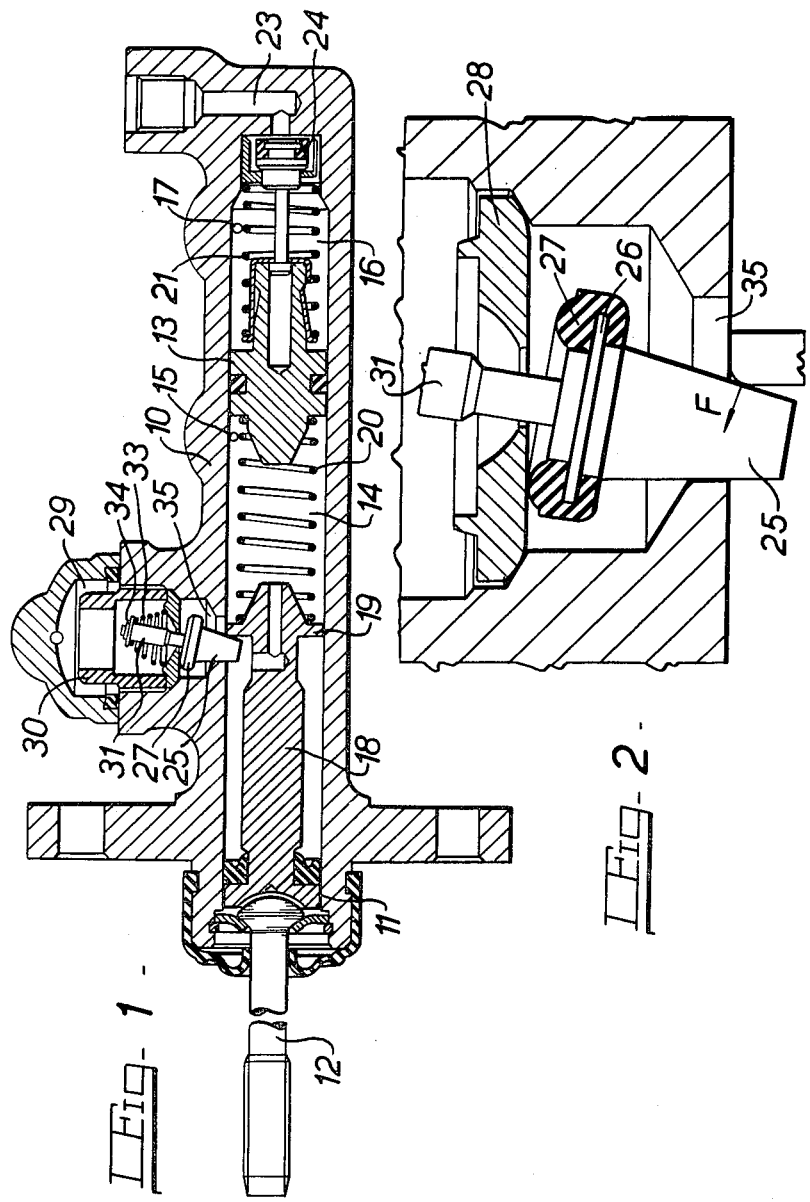

United States Patent Office 3,262,273
Patented July 26, 1966

3,262,273
MASTER CYLINDERS FOR HYDRAULIC
BRAKING SYSTEMS
Dennis Francis Harvey, Birmingham, England, assignor to Girling Limited, Birmingham, England, a British company
Filed Dec. 30, 1964, Ser. No. 422,156
Claims priority, application Great Britain, Jan. 1, 1964, 20/64
10 Claims. (Cl. 60—54.6)

This invention relates to improvements in master cylinders for hydraulic braking systems of the kind in which communication between a pressure space in the cylinder and a reservoir is established in the off position of the brake through a spring-loaded tipping valve having a stem which extends into the pressure space and is engaged by a part of a piston working in the cylinder when the piston is in its fully retracted position.

The engagement of the piston with the stem of the valve holds the valve in the open position, the valve closing automatically when the piston is advanced to apply the brake, and the stem of the valve forms a stop defining the off position of the piston.

The piston is urged into the retracted position by a return spring, and in usual arrangements where the stem of the valve extends through a clearance opening between the valve seating and the cylinder bore the loading imposed by the return spring tends to rock about one edge of the opening as a fulcrum. If the clearance is sufficiently great the head of the valve may be forced into the port leading to the reservoir, particularly where the valve stem does not extend above the head and the valve spring is located on the cylinder side of the head.

According to my invention, in a master cylinder in which a pressure space in the cylinder communicates with a reservoir through a tipping valve which forms a stop for the piston when the piston is fully retracted the stem of the valve which extends into the cylinder bore or the opening through which the stem extends into the bore or both is inclined or coned in such a manner that the load applied to the valve stem by the return spring for the piston is wholly contained within the stem and there is no appreciable moment tending to rock the valve about its engagement with the wall of the opening.

One example of my invention as applied to a tandem master cylinder is illustrated in the accompanying drawings in which:

FIGURE 1 is a longitudinal section of the cylinder;

FIGURE 2 is a fragmentary section on a larger scale of the tipping recuperation valve shown in FIGURE 1, the valve being shown in the open position.

Figure 3:
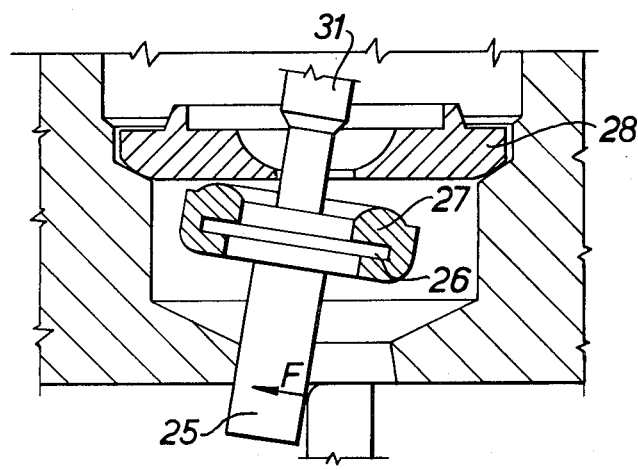
FIGURE 3 is a fragmentary section on a larger scale of an alternative construction for the tipping recuperation valve shown in FIGURE 1, the valve being shown in the open position.

In the tandem master cylinder illustrated the body 10 has a cylindrical bore in which works a main piston 11, actuated by a push-rod 12 from a pedal or the like, and a secondary piston 13. A primary pressure space 14 between the pistons is adapted to be connected through a port 15 in the cyinder wall to the slave cylinders of the brakes on one pair of wheels of a vehicle and a secondary pressure space 16 between the secondary piston 13 and the closed end of the cylinder is adapted to be connected through another port 17 to the slave cylinders of the brakes on another pair of wheels.

The main piston has a forward extension 18 on the free end of which is an annular flange 19. A compression spring 20 is located between this flange and the secondary piston and a compression spring 21 is located between the secondary piston and the closed end of the cylinder. When the pedal is released these springs return the pistons to their normal retracted positions shown in FIGURE 1.

A passage 23 in the closed end of the cylinder adapted to be connected to a recuperation reservoir is controlled by an axial valve 24 of known type which is coupled to the secondary piston whereby, when that piston is in its fully retracted position, the valve is held open to establish communication between the secondary pressure space 16 and the reservoir and the valve closes automatically as the piston is advanced to apply pressure to liquid in the pressure space 16.

The primary pressure space 14 communicates with a recuperation reservoir through a tipping valve which is controlled by the flange 19 on the main piston. This valve comprises a stem 25 extending inwardly from a head 26 carrying a rubber or other ring 27 adapted to engage a seating formed by the underside of an apertured disc 28 held against a shoulder at the lower end of a chamber 29 by a screwed sleeve 30. The valve has a shank 31 extending upwardly through the opening in the disc 28 and is loaded by a spring 33 abutting between the disc 28 and a thrust washer 34 fixed on the upper end of the shank.

The stem 25 is coned and extends downwardly into the cylinder bore through a drilled hole 35 of which the axis is at right angles to that of the bore.

In the retracted position of the main piston in which the stem 25 forms a stop for the piston the flange 19 applies to the valve stem a force indicated by the arrow F in FIGURE 2 which acts on one side of the stem in a direction substantially at right angles to the inclined surface of the stem and urges the stem against an abutment formed by the opposite side of the hole 35 through which the stem extends. The line of action of the force F intersects the surface of the hole against which the stem is urged and with which it makes line contact over the full axial length of the hole. The load is thus wholly contained within the stem and there is no appreciable moment tending to rock the valve about its engagement with the wall of the hole.

In the closed position of the valve the stem 25 is normally substantially central with respect to the hole 35 through which it extends, and when the flange 19 first engage the stem as the main piston moves towards the retracted position the valve will move bodily for a short distance until the shank 31 of the valve stem above the head engages the edge of the opening in the valve seat 28 leading to the reservoir. The valve then tilts about the point of engagement of the head 26 with the seat 28 and its shank slides about its initial pivot point. The valve stem then engages with the upper edge of the abutment formed by one side of the hole 35, about which point the stem tilts to bring it into full line engagement with the abutment in the open position of valve. Simultaneously the shank is moved away from its initial abutment to restore the clearance between the shank and the opening in the valve seat. Thus any wear or damage due to impact will occur on the edge of the abutment remote from the cylinder bore and there will be no damage to the inner edge which might lead to damage to the piston seal.

The axial length of the hole 35 through which the stem extends and which provides the abutment will depend on the cone angle chosen for the valve stem. A convenient cone angle is 10°.

Another advantage of my improved tipping valve construction is that there is more effective control of the "cut off" or travel of the piston on operation of the pedal before the valve closes. The amount of travel is affected by the cone angle of the valve stem but is more predictable and can be kept within closer limits in mass production than has hitherto been possible.

In an alternative construction shown in FIGURE 3, where corresponding reference numerals have been used to indicate corresponding parts, the valve stem 25 is cylindrical and extends through a coned hole 35 in the cylinder wall into the cylinder bore, the hole being of greater diameter at the end leading into the bore.

My invention is applicable to single piston master cylinders as well as to tandem master cylinders and in a tandem master cylinder both pressure spaces may communicate with a reservoir through a tipping valve as described above.

I claim:

1. A master cylinder for an hydraulic braking system comprising a cylinder, a pressure space in the cylinder, at least one piston working in the cylinder bore to apply pressure to liquid in the pressure space, a reservoir for liquid communicating with said pressure space through a valve port controlled by a tipping valve, a stem on said tipping valve extending into said cylinder bore through an opening in the wall of the cylinder, a return spring adapted to urge said piston into a retracted position, a stop formed by the stem of the tipping valve against which the piston engages when the piston is in the retracted position, and at least one of the stem and the wall of the opening through which the stem extends being coned whereby the load applied to the stem by the return spring for the piston is wholly contained within the stem and there is no moment tending to rock the stem about its engagement with the wall of the opening.

2. A master cylinder as claimed in claim 1 in which the valve stem is coned and extends through a cylindrical clearance hole in the cylinder wall of which the axis is at right angles to that of the cylinder bore.

3. A master cylinder as claimed in claim 1 in which the valve stem is cylindrical and extends through a coned hole in the cylinder wall, the greatest diameter of the hole being at the end leading into the bore.

4. In a master cylinder for an hydraulic braking system including a cylinder, a pressure space in the cylinder, at least one piston working in the cylinder bore to apply pressure to liquid in said pressure space, a return spring adapted to urge said piston into a retracted position, and a reservoir for liquid communicating with said pressure space through a tipping valve, controlling communication between said reservoir and said pressure chamber and comprising an apertured disc providing communication between said reservoir and said pressure space and having opposite sides, a seating on the side of the disc adjacent to a cylindrical hole in the wall of the cylinder of which the axis is at right angles to that of the cylinder, a head carrying a ring of resilient material located between said disc and said cylindrical hole and adapted to engage said seating, a shank extending upwardly through said aperture in said disc, a spring abutting between said disc and a thrust washer fixed on the end of said shank remote from said disc, and a coned stem extending into said cylinder bore through the cylindrical hole in said cylinder wall in which it has a substantial clearance, an abutment defined by the cylinder wall around said opening against which the stem of the valve is adapted to engage when said piston is in the retracted position, said stem forming a stop against which the piston engages when the piston is in the retracted position whereby the load applied to the stem by the return spring is wholly contained within the stem and there is no moment tending to rock the valve stem about its engagement with the wall around the cylindrical hole.

5. In a master cylinder for an hydraulic braking system including a cylinder, a pressure space in the cylinder, at least one piston working in the cylinder bore to apply pressure to liquid in said pressure space, a return spring adapted to urge said piston into a retracted position, and a reservoir for liquid communicating with said pressure space through a tipping valve controlling communication between said reservoir and said pressure chamber and comprising an apertured disc providing communication between said reservoir and said pressure space and having opposite sides, a seating on the side of the disc adjacent to a coned hole in the wall of the cylinder of which the axis is at right angles to that of the cylinder, a head carrying a ring of resilient material located between said disc and said coned hole and adapted to engage said seating, a shank extending upwardly through said aperture in said disc, a spring abutting between said disc and a thrust washer fixed on the end of said shank remote from said disc, and a cylindrical stem extending into said cylinder bore through the coned hole in said cylinder wall in which it has a substantial clearance, an abutment defined by the cylinder wall around said coned hole against which the stem of the valve is adapted to engage when said piston is in the retracted position, said stem forming a stop against which the piston engages when the piston is in the retracted position whereby the load applied to the stem by the return spring is wholly contained within the stem and there is no moment tending to rock the valve stem about its engagement with the wall around the coned hole.

6. A tandem master cylinder for an hydraulic braking system comprising a cylinder, a positively actuated main piston working in the cylinder bore, a floating secondary piston working in the cylinder bore, a first pressure space between said pistons, a second pressure space between said secondary piston and an end of the cylinder, a reservoir for liquid communicating with said first pressure space through a tipping valve, a stem on said tipping valve extending into said cylinder bore through an opening in the wall of the cylinder, a first compression spring located between the main piston and the secondary piston, a second compression spring located between the second piston and said end of said cylinder, said springs normally holding said pistons in retracted positions, an abutment defined by the cylinder wall around said opening against which the stem of the valve is adapted to engage when said pistons are in the retracted positions, a stop formed by the stem of the tipping valve against which said main piston engages when said main piston is in its retracted position, at least one of the stem of the valve and the wall of the opening through which the stem extends being coned whereby the load applied to the stem by the return springs is wholly continued within the stem and there is no moment tending to rock the stem about its engagement with the wall of the opening, a port in said end of the cylinder leading to a reservoir, an axially movable valve adapted to engage a seating on said end of the cylinder around the port, and a coupling between said axially movable wall and the secondary piston.

7. A tandem master cylinder as claimed in claim 6, in which said main piston has a forward extension carrying a radial flange adapted to engage said stem to tilt said tipping valve into an open position when the main piston is in the fully retracted position.

8. A tandem master cylinder as claimed in claim 6, in which the valve stem of said tipping valve is coned and extends through a cylindrical clearance hole in the cylinder wall of which the axis is at right angles to that of the cylinder bore.

9. A tandem master cylinder as claimed in claim 6, in which the valve stem is cylindrical and extends through a coned hole in the cylinder wall, the greatest diameter of the hole being at the end leading into the bore.

10. A master cylinder for an hydraulic braking system comprising a cylinder, a pressure space in the cylinder, at least one piston working in the cylinder bore to apply pressure to liquid in the pressure space, a reservoir for liquid communicating with said pressure space through a valve port controlled by a tipping valve, a stem on said tipping valve extending into said cylinder bore through an opening in the wall of the cylinder, a return spring adapted to urge said piston into a retracted position, an abutment defined by a part of the cylinder wall around said opening and against which a mid portion of the stem of the valve is adapted to engage when said piston is in said retracted position, and at least one of the stem and the wall of the opening through which the stem extends being coned whereby the load applied to the stem by the return spring for the piston is wholly contained within the stem and there is no moment tending to rock the stem about its engagement with the wall of the opening.

References Cited by the Examiner

FOREIGN PATENTS 56,248    6/1952    France.
539,095    8/1941    Great Britain.

MARTIN P. SCHWADRON, *Primary Examiner.*

ROBERT R. BUNEVICH, *Examiner.*